July 29, 1969
F. J. MURPHREE
3,458,854
ECHO DETECTION AND RANGING SYSTEM
Filed July 8, 1968
3 Sheets-Sheet 1
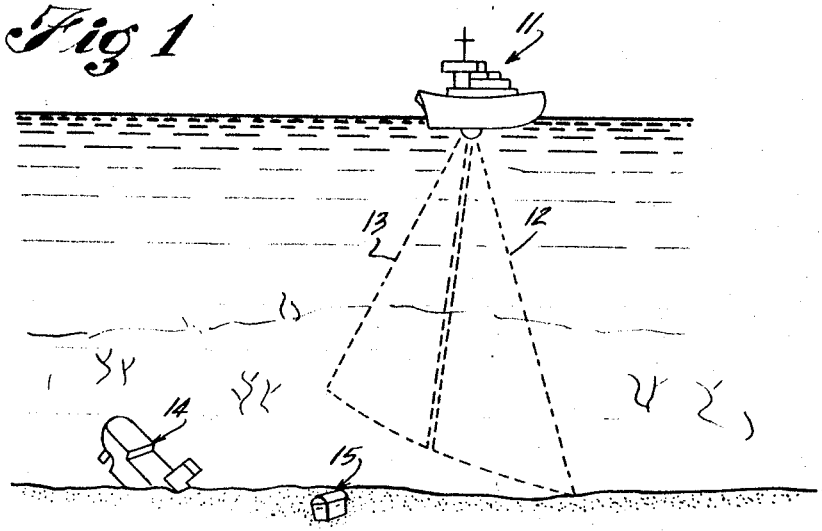
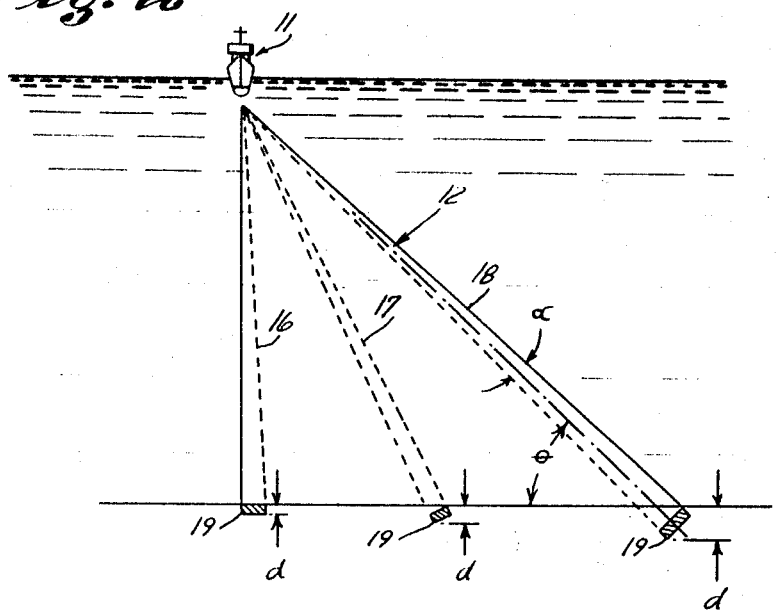
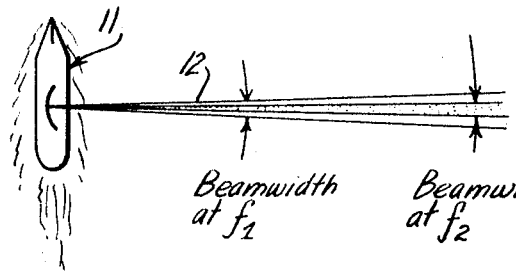
INVENTOR.
Francis J. Murphree
BY William T. Skeer
Agent
Dox D. Dox
Attorney

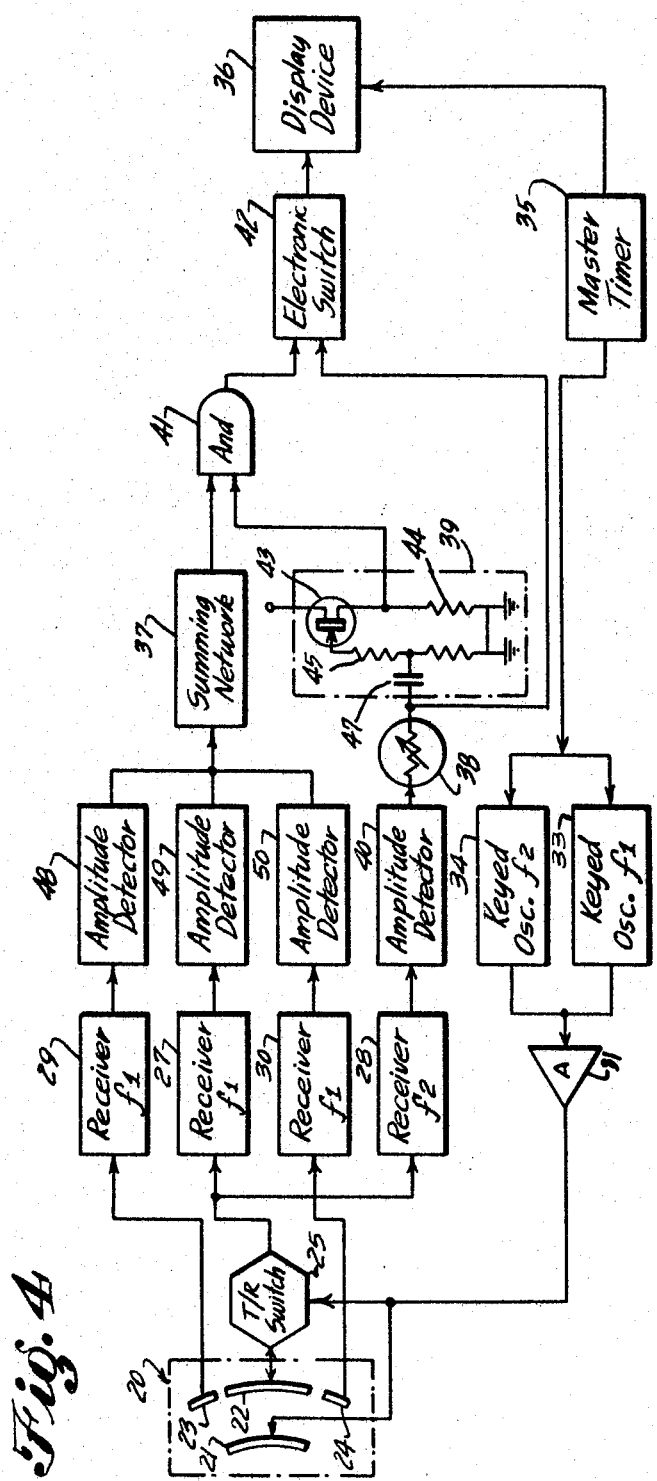

July 29, 1969  F. J. MURPHREE  3,458,854
ECHO DETECTION AND RANGING SYSTEM
Filed July 8, 1968  3 Sheets-Sheet 3

INVENTOR.
Francis J. Murphree
BY William T. Skeen
Agent
Doc D. Doty
Attorney

United States Patent Office 3,458,854
Patented July 29, 1969

3,458,854
ECHO DETECTION AND RANGING SYSTEM
Francis J. Murphree, Sunnyside, Fla., assignor to the United States of America as represented by the Secretary of the Navy
Filed July 8, 1968, Ser. No. 743,190
Int. Cl. G01s 9/66
U.S. Cl. 340—3                                    10 Claims

ABSTRACT OF THE DISCLOSURE

An echo detection and ranging system for locating both shallowly buried objects and proud objects employs a multi-element transducer array transmitting and receiving a plurality of frequencies, a multi-channel receiver, and logic circuit means interconnecting certain of the channels of said multichannel receiver. An electronic switch alternately connects the outputs of the different frequency receiver channels to a display device.

---

The invention described herein may be manufactured and used by or for the Government of the United States of America for governmental purposes without the payment of any royalties thereon or therefor.

This invention pertains generally to an echo detection and ranging system for use on board marine vehicles, including surface and subsurface, both powered and towed, to locate objects on the bottom of a body of water and shallowly buried therein. In particular, the invention concerns an acoustical echo detection and ranging system which insonifies a fan shaped volume of water beneath the marine vehicle and impinges on the sea bottom with two widely separated acoustic frequencies. Further, the system incorporates receivers for each of the frequencies, appropriate logic circuitry, and a common display device arranged in a circuit permitting the simultaneous display of echo returns from both proud and buried targets in such a fashion as to enable an operator to distinguish therebetween.

The echo ranging of buried objects has been accomplished, in the prior art, with a variety of systems. Generally, the prior art buried-target sonar systems have em-employed scanning transducer arrays. These systems, while having the undeniable advantage of operational capabilities at the angle of inclination providing the most favorable ratio between echo and reverberation signals, are complex and, accordingly, expensive to acquire, install, and maintain. Prior art attempts to obviate the complexities of a scanning transducer array have employed a narrow, downward-looking, conical beam which, while having some of the signal definition advantages of the moving transducer systems scanned so as to generate a cone, suffer in comparison therewith from increased surface reverberation resulting from the large insonified volume of the beam. The area investigated by the downward looking cone when the size thereof has been adjusted to minimize the surface reverberation is small in comparison with the scanned transducer type, and attempts to overcome these limitations by employing a plurality of these conical beams results in an installation of a mechanical complexity approaching that of the moving, or scanned, transducer arrangement.

The use of a side-looking, fan-shaped beam has, heretofore, been considered unsatisfactory for buried objects. When such a beam is used, the returning echo signal from deeply buried objects, which is weakened by the attenuation of the bottom material, is masked by the bottom reverberation from the same acoustic range. As a result of the foregoing limitations, the fan-shaped, side-looking beams have been primarily utilized for echo and ranging systems designed to locate objects resting on the bottom and standing proud therefrom. In this application, considerable development has resulted in units optimized for the higher frequencies useful for the detection and ranging of objects proud of the bottom. Separate prior art devices of the general type referred to above were used in the detection of objects buried beneath the bottom.

There are certain fields of endeavor in which both the objects standing proud of the bottom and those beneath the bottom are of interest. Particularly in this category are the fields of marine salvage and minehunting. In these particular applications, as well as others, the buried objects of interest are only shallowly buried as by submergence impact or bottom current action, either in the case of salvage or marine mines, or intentionally so placed, in the case of marine mines. In these select fields, heretofore, separate detection and ranging systems have been utilized, one for buried objects and one for objects resting on the bottom and standing proud therefrom. The requirement for installation of two complete systems, especially one carrying the unusual capability of resolving objects as small as marine mines, and the correlative high cost thereof have minimized the number of ships capable of searching for both buried and proud objects.

In view of the foregoing, it is an object of this invention to provide an echo detection and ranging system which will provide an indication of objects both resting on and shallowly buried beneath the bottom of a body of water.

The provision of an echo detection and ranging system to locate objects resting on the bottom of a body of water as well as those buried beneath said bottom and capable of distinguishing therebetween is a further object of this invention.

A further object of this invention is the provision of an object detection and ranging system for marine vehicles employing a side-looking, fan-shaped beam of acoustic energy of two frequencies.

Another object of this invention is the provision of a marine echo detection and ranging system having a single indicator for the simultaneous display of echoes from objects which stand proud of the bottom and echoes from objects shallowly buried beneath said bottom.

Other objects and many of the attendant advantages will be readily appreciated as the subject invention becomes better understood by reference to the following detailed description, when considered in conjunction with the accompanying drawings wherein:

FIG. 1 depicts the use of the device of the invention in a typical environment;

FIG. 2 shows a bow-on view of a ship with the insonified volume typical of that used in the operation of this device;

FIG. 3 illustrates, in plan view, the relationship of the insonified area of the device of the invention with respect to a marine vessel using said device;

FIGS. 4 and 6 are block diagrams of two species of the subject invention, respectively.

Figure 6:
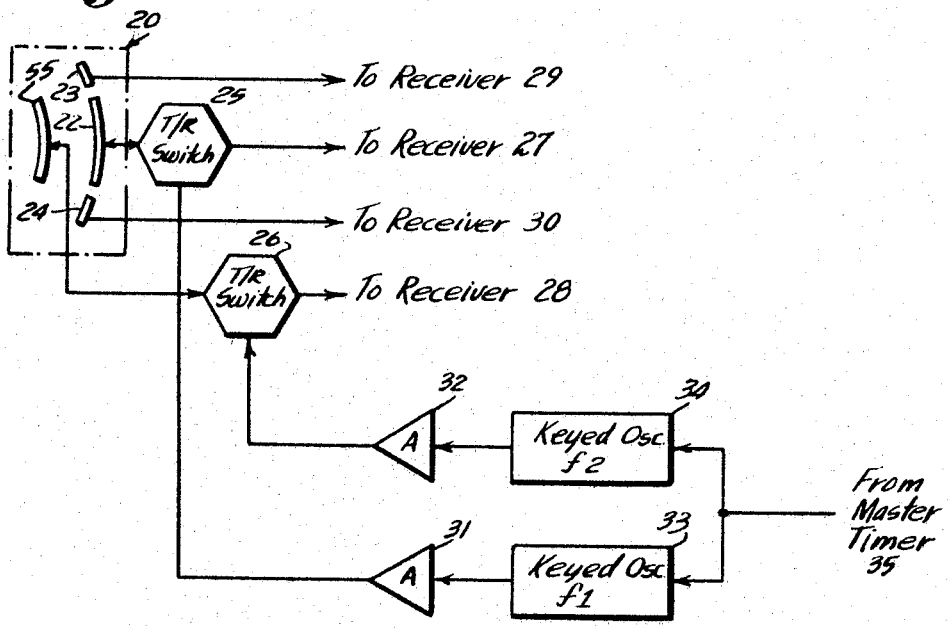

Referring to FIG. 1, a ship 11 is shown investigating an area employing two systems according to the invention, as evidenced by the two fan-shaped acoustic beams 12 and 13. Two independent systems are employed to prevent ambiguity between port and starboard echo returns. As ship 11 proceeds along its investigative course, various objects reflect acoustic energy from the insonified beam to the ship 11 and, more particularly, to the receiving gear carried thereby. Some of these objects, as shown at 14, protrude from the bottom or rest thereon so as to stand proud therefrom; others are covered with bottom silt, sand, or other material so as not to present any discontinuity in the bottom surface as shown at 15.

The echo-ranging equipment is illustrated as being housed within surface ship 11 for purposes of explanation. It should be understood that in practice the various units of the system may be housed in a towed subsurface vehicle to good advantage. Such alternative location is conventional practice in the art and may be incorporated with the exercise of the skills normally attributable to the proficient artisan without departing from the scope of the invention.

Each of these two target types present special problems in detection, which, as noted above, have heretofore required separate echo detection and ranging equipment. The proud targets are best identified by a relative high frequency insonifying signal with a practically sized transducer giving good resolution because of the relatively short wavelength. The high frequency signal also produces more sharply defined shadows than signals of lower frequencies which have a tendency to disperse and fill in shadowed volumes with echo-producing acoustic energy. Further, the insonifying signal's ability to penetrate the bottom is greatly reduced as the signal frequency is increased.

The lower frequencies of insonifying energy penetrate the bottom more effectively than the higher frequencies, but offer less definition for proud objects, rendering their recognition more difficult. In the prior art, as discussed above, buried objects were located by scanning an area of the bottom with a pencil like ray (or plurality of rays) of radiation, such as might be represented by the acoustic energy ray 18 (FIG. 2). In such a system the resulting insonified volume is conical shaped.

However, frequency is not the sole consideration. The interaction of the beam, as shown diagrammatically at FIG. 2, a narrow acoustic energy ray, shown at 18 for example, with an angular width $\alpha$ impinges the bottom at a grazing angle $\theta$. Acoustic ray 18 may be, for purposes of explanation, considered as an independent beam to be scanned in a cone or as an incremental portion of a fan-shaped beam. As the pulse of acoustic energy, represented by shaded block 19, strikes the bottom a reverberation signal will be returned depending, in extent, upon the beam width $\alpha$ and the angle of grazing incidence $\theta$. Because of the relative strength of this reverberation as compared to the attenuated echo signal returned by a buried object, the reverberation signal tends to mask returns from objects less than a minimum distance $d$ beneath the bottom surface. It is obvious from inspection that the minimum distance $d$ decreases as the angle of incidence increases. At normal incidence, as illustrated by acoustic ray 16, the distance $d$ is a minimum and is given by the expression:

$$d = \frac{cT}{2}$$

where:

$c$ is the acoustic propagation velocity in the sea bottom material, and
$T$ is the pulse length.

For the minimum angle of incidence on a sand bottom, i.e., $\theta = 45°$, the value of $d$ is closely approximated by:

$$d = r\alpha \cos \theta$$

where:

$r$ is the slant range to the sea bottom, and
$\alpha$ is the beam width.

Considering typical operational values the minimum distance ranges from one and one half inches at normal incidence, as shown by acoustic ray 16, to approximately eight and one-half inches at minimum incidence, as shown by acoustic ray 18. Intermediate values, as represented by ray 17, lie between these ranges. Objects within this range are of great interest to the salvage and minesweeping operations. Since the bottom reverberations for both the scanned conical beam and the fan-shaped beam are the same, the fan shaped beam is preferable due to the simplified construction thereof which obviates scanning transducers and associated complexities.

The foregoing propaedeuic discussion of the operational considertaions is not intended to represnet a rigorous treatment of the parameters of design but, rather, serve to indicate to a proficient artisan some considerations governing the particular design of the system to be completely described herein. A rigorous treatment would include considerations of refractions, both in the water and the bottom, surface conditions relating to surface reverberations, and frequency and pulse width considerations of the insonifying energy. Such a detailed theoretical discussion of environmental conditions relating to acoustic propagation is not believed necessary to the understanding of the system of the invention, but is available in standard works, if desired.

Although the device of the invention is shown in FIG. 1 as being used in pairs so as to investigate submerged objects on both sides of the ship's course, the device may be operated singly, if desired, and will be so described herein. While the beamwidth of the fan-shaped beam may be controlled to a degree by alternation of the configuration thereof and the use of accessory devices such as acoustic lenses, the breadth thereof is, in the final analysis, determined by the physical size of the transducer array which may be conveniently mounted on the equipped vessel. The space considerations most frequently encountered dictate a transducer array of a linear extent of approximately three feet. Predictably, using the same linear dimension for the two transducers results in a beamwidth of slightly different angular extent for the two frequencies, as shown in FIG. 3. The respective beamwidths are approximately related to each other as the inverse ratio of their frequencies.

Diagrammatically shown in FIG. 4 is an organization of known echo ranging components effectively interconnected to meet the objects of invention outlined above. A transducer array 20 is focused on the bottom by any of several known means, including, for example, figured transducer elements, variable mountings, and acoustic lenses. The acoustic array 20 includes four individual electro-acoustic transducers. One of the transducers of array 20, transducer 21, is used only for transmitting, another, transducer 22, is reversible and is used for transmitting and receiving. Remaining transducers 23 and 24 are hydrophones and, accordingly, are used only for the reception of returning echo signals. Reversible transducer 22 is connected, via T/R switch 25, to a driving amplifier 31 while transducer 21 is connected directly thereto. Amplifier 31 is fed by simultaneous pulses from keyed oscillators 33 and 34, which are fed keying pulses from a suitable master timer circuit 35.

Master timer circuit 35 supplies trigger or keying pulses at the desired ping rate, as well as providing synchronized pulses at a predetermined higher rate to a suitable display device 36 to initiate individual display scan therein. Any of several known timer circuits which provide sufficient accurately for ranging applications may be employed for master timer circuit 35. Likewise, display device 36 may be chosen from among the many available types by a proficient artisan without departing from the scope of the present invention. Display devices which are characterized by having means, e.g., helical recorder, memory tube, etc., to provide a degree of signal enhancement of line by line integration, have been found particularly suitable in this application. It should be noted that, for some types of display devices, the master timer 35 may be an integral part of the display device 36. Graphic recorders and others employing mechanical scanning are typical of this class of display devices where the master timer 35 is advantageously incorporated in display device 36. This type of display device is preferred in the present invention because of the inherent trace-by-trace correlation enhances the target echoes of shallowly buried targets which tend to be masked by reverberation.

Upon receipt of a keying pulse from master timer 35, oscillators 33 and 34 each produce an acoustical frequency voltage pulse. The respective frequencies differ from one another by a factor of approximately ten. For example, frequency $f_1$, that of oscillator 33, may be 30 kHz., while frequency $f_2$, that of oscillator 34, may be 300 kHz. The foregoing frequencies need not be exact nor stand in exact ratios to each other, and, obviously, the frequencies used to insonify acoustic beam 12 will differ from those used to insonify acoustic beam 13.

Amplifier 31, which may be any suitable circuit configuration capable of providing suitable driving power over the desired frequency range, drives transducer element 21 directly to radiate energy at frequency $f_2$. Amplifier 31 is connected to reversible transducer 22 through a transmit-receive switch 25 which safeguards the delicate and highly sensitive circuits of acoustic receivers 27 and 28 from damage by the high voltage acoustic frequency pulse.

The echo signals returning to focused transducer array 20 impinge upon reversible transducer 22, where they are converted to electrical signals of frequencies $f_1$ and $f_2$ and fed, via transmit-receive switch 25, to acoustic receivers 27 and 28. Reversible transducer 22 is dimensionally equivalent to transducer 21 and has a compatible directivity with respect to the higher frequency. However, because of well known relationships between dimensions and beamwidth, the beamwidth at the lower frequency is not as narrow. Hydrophone elements 23 and 24 are positioned adjacent to reversible transducer 22 to improve the directivity of the focused array 20 with respect to the lower frequencies. Hydrophones 23 and 24, together with circuitry associated therewith, also improve the signal-to-noise ratio at the lower frequencies, as will be understood from the explanation of the accompanying block diagram. The receivers 27 and 28, as well as receivers 29 and 30, to be discussed subsequently, are state of the art design and, naturally, incorporate suitable time-varied-gain and/or automatic gain control circuitry to improve the performance thereof.

Referring to FIG. 4, it is seen that the outputs of receivers 27 and 28 are detected by amplitude detectors 49 and 40, respectively. The signals from hydrophones 23 and 24 are respectively supplied to frequency $f_1$ receivers 29 and 30. The outputs thereof are detected by amplitude detectors 48 and 50. The output signals of amplitude detectors 48, 49 and 50 are combined in a summing network 37 of conventional design. Echo returns from a buried object 15 (see FIG. 1) arrive at reversible transducer 22 and hydrophones 23 and 24 in timely relationship such that the signals reinforce each other in summing network 37. Reverberation, however, is incoherent, and there is appreciable destructive combination within summing network 37 of the reverberation signals from amplitude detectors 48, 49, and 50 to minimize their effects. The aforedescribed action of the separate frequency $f_1$ channels these results in an improved signal-to-reverberation performance in said channels with respect to a single channel such as the illustrated frequency $f_2$ channel.

The output of the summing network 37 is applied, via an And gate 41, to an electronic switch 42. The output of the frequency $f_2$ channel comprising receiver 28 and amplitude detector 40 is adjusted in amplitude by a suitable gain control 38 to a value having a predetermined relationship to the amplitude of the output of summing network 37. The adjusted output is fed from the gain control 38 to electronic switch 42. Electronic switch 42 supplies the outputs of the frequency $f_1$ and frequency $f_2$ channels in alternating intervals to display device 36.

Figure 5:
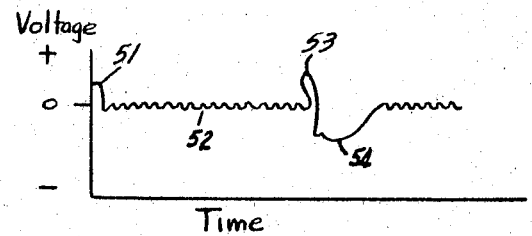
FIG. 5 is a waveform illustration to be referred to in the discussion of FIGS. 4 and 6.

A clamp circuit 39 is also fed by the adjusted output of the $f_2$ channel and the output thereof is fed to gate circuit 41. Clamp circuit 39 includes a semiconductor device 43 having an emitter resistor 44 in circuit therewith. The output of the gain control 38 is fed through a current limiting resistor 45 after passing through an RC network comprising resistor 46 and capacitor 47. This RC network serves only to remove the average DC component from the signal. As shown in FIG. 5, an idealized receiver output waveform taken beyond the RC network has a transmitter pulse 51 which is caused by leakage back through the associated T/R switch or receiver overload. The transmitter pulse is followed by a period of reverberation signal 52 prior to a pulse or echo signal 53. The object producing echo signal 53 casts a shadow in the acoustic beam which interrupts the normal reverberation signal 52 thereby producing a negative shadow signal 54. During intervals of shadow signal 54, the output of the frequency $f_2$ channel, is seen to drop to a low value. This, in turn, causes the conduction of semiconductor device 43 in clamp circuit 39 to diminish. A corresponding reduction in the voltage developed across resistor 44 causes And gate 41 to become non-conductive, thereby removing the frequency $f_1$ channel output from electronic switch 42 and thence from display device 36. The interruption of the frequency $f_1$ signal prevents shadows on the shorter wavelength frequency $f_2$ channel from being filled in by the frequency $f_1$ reverberation and dispersion. If normal reverberation is present on the frequency $f_2$ channel, then the frequency $f_1$ echoes from shallowly buried objects will pass And gate 41 to be displayed without shadow on display device 36, thereby permitting the operator to distinguish between proud and buried objects.

A slightly modified form of the device of the invention is shown in FIG. 6 in which the two frequency channels remain separated. In place of transmitting transducer 21, a reversible transducer 55 is employed and is connected to receiver 28 by a second transmit-receive switch 26. Keyed oscillator 34 feeds a second amplifier 32, which drives reversible transducer 55, via the transmit-receive switch 26, during transmission intervals. This arrangement is otherwise the same as that shown in FIG. 4 and permits the amplifiers 31 and 32 as well as transducers 22 and 55 to be optimized in design to accommodate the appropriate frequencies with only a slight increase in circuit complexity.

From the foregoing description it is seen that applicant has provided an integrated echo detection and ranging system which will provide an indication of and distinguish between objects resting on and standing proud of the bottom as well as those buried shallowly thereunder. It will be readily appreciated by those familiar with the art that this herein disclosed system is compatible with modern service requirements, meets a long standing problem directly, and in an improved manner, when compared with prior art constructions, meets the afore set forth objects of invention, and is, therefore, a significant advance in the echo detection and ranging arts.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the invention.

What is claimed is:
1. An echo detection and ranging system comprising:
   transducer means effective to energize an angular, fan-shaped sector with wave energy of two predetermined frequencies and to receive echo returns retro-reflected from objects lying therein;
   a first electronic circuit means electrically connected to said transducer means and effective to supply electrical drive signals of said two predetermined frequencies thereto;
   a first receiver channel electrically connected to said transducer means and operative to amplify and pass the electrical analog of echo signals impinging there- on when said echo signals are of the lower of said two predetermined frequencies while restricting other electrical signals;

a second receiver channel electrically connected to said transducer means and operative to amplify and pass the electrical analog of echo signals impinging thereon when said echo signals are of the higher of said two predetermined frequencies while restricting other electrical signals;

an electronic logic circuit means effectively electrically joined to said first and second receiver channels and operative to interrupt the output of said first receiver channel during intervals of predetermined operating conditions of said second receiver channel;

a second electronic circuit means electrically coupled to said electronic logic circuit means and similarly joined to said second receiver channel and operationally effective to combine the electrical output signals therefrom into a single output of alternating periods of each signal;

display means electrically attached to said second electronic circuit means and operative in such a fashion as to provide a visual representation of the output thereof; and timing means electrically joined to said first electronic circuit means and said display means and operative to synchronously supply thereto electrical signals for the predetermined timing thereof.

2. An echo detection and ranging system according to claim 1 in which said first electronic circuit means and said receiver channels are electrically connected to said transducer means by means of at least one transmit-receive switch circuit.

3. An echo detection and ranging system according to claim 1 in which said electronic logic circuit includes a solid state device connected so as to alter its conduction in response to the strength of the output of said second receiver channel.

4. An echo detection system according to claim 1 in which said first electronic circuit means includes two keyed electronic oscillator circuits with outputs at said two predetermined frequencies electrically fed to suitable amplifier means.

5. An echo detection and ranging system according to claim 4 in which said amplifier means includes an independent amplifier circuit associated with each of said two electronic oscillator circuits.

6. An echo detection and ranging system according to claim 4 in which said two electronic oscillator circuits are electrically connected to said timing means to be keyed simultaneously thereby to produce synchronized bursts of electrical energy at said two predetermined frequencies.

7. An echo detection and ranging system according to claim 1 in which said transducer means includes at least one reversible electro-acoustic transducing device.

8. An echo detection and ranging system according to claim 7 in which said reversible electro-acoustic transducing device is disposed in radiation-pattern-forming relationship with a plurality of other electro-acoustic devices to enhance the electro-acoustic transduction of echoes returns from the aforesaid angular, fan-shaped sector.

9. An echo detection and ranging system according to claim 8 in which one of said receiver channels is comprised by a plurality of subchannels.

10. An echo detection and ranging system according to claim 9 in which said one of said receiver channels is said first receiver channel.

References Cited

UNITED STATES PATENTS

| | | | |
|---|---|---|---|
| 3,175,214 | 3/1965 | Ramsay et al. | 343—13 |
| 3,267,416 | 8/1966 | Morse | 340—3 |

RICHARD A. FARLEY, Primary Examiner

U.S. Cl. X.R.

343—13